US010433189B2

(12) United States Patent
Desai et al.

(10) Patent No.: US 10,433,189 B2
(45) Date of Patent: Oct. 1, 2019

(54) FLEXIBLE RADIO ASSIGNMENT

(71) Applicant: Cisco Technology, Inc., San Jose, CA (US)

(72) Inventors: Vishal Satyendra Desai, San Jose, CA (US); Pooya Monajemi, Redwood City, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 15/382,059

(22) Filed: Dec. 16, 2016

(65) Prior Publication Data

US 2017/0324439 A1    Nov. 9, 2017

Related U.S. Application Data

(60) Provisional application No. 62/333,599, filed on May 9, 2016.

(51) Int. Cl.
| | | |
|---|---|---|
| *H04W 24/08* | (2009.01) | |
| *H04W 24/02* | (2009.01) | |
| *H04B 1/48* | (2006.01) | |
| *H04W 64/00* | (2009.01) | |
| *H04W 16/22* | (2009.01) | |
| *H04W 72/04* | (2009.01) | |
| *H04W 16/10* | (2009.01) | |
| *H04W 16/14* | (2009.01) | |

(Continued)

(52) U.S. Cl.
CPC .............. *H04W 24/02* (2013.01); *H04B 1/48* (2013.01); *H04W 16/10* (2013.01); *H04W 16/14* (2013.01); *H04W 16/22* (2013.01); *H04W 64/003* (2013.01); *H04W 72/0433* (2013.01); *H04W 72/0453* (2013.01); *H04B 2001/485* (2013.01); *H04W 76/14* (2018.02); *H04W 84/12* (2013.01); *H04W 88/12* (2013.01)

(58) Field of Classification Search
None
See application file for complete search history.

(56) References Cited

U.S. PATENT DOCUMENTS

| | | |
|---|---|---|
| 9,398,556 B2 | 7/2016 | Fix et al. |
| 2006/0109799 A1 | 5/2006 | Tseng et al. |

(Continued)

FOREIGN PATENT DOCUMENTS

| | | |
|---|---|---|
| WO | 2005015839 A1 | 2/2005 |
| WO | 2015055871 A1 | 4/2015 |
| WO | 2015112173 A1 | 7/2015 |

OTHER PUBLICATIONS

International Search Report for Application No. PCT/US2017/031599 dated Aug. 7, 2017.

*Primary Examiner* — Brandon M Renner

(74) *Attorney, Agent, or Firm* — Patterson + Sheridan, LLP

(57) ABSTRACT

A flexible radio assignment algorithm that reduces co-channel interference in Wi-Fi networks is disclosed. The flexible radio assignment algorithm calculates a density value for each of the APs controlled by a network controller. The flexible radio assignment algorithm selects an AP with the highest density value and determines that a radio in the selected AP is redundant. The flexible radio assignment algorithm manages the redundant radio in the selected AP to mitigate co-channel interference in a frequency band.

19 Claims, 13 Drawing Sheets

(51) Int. Cl.
 *H04W 84/12* (2009.01)
 *H04W 88/12* (2009.01)
 *H04W 76/14* (2018.01)

(56) References Cited

U.S. PATENT DOCUMENTS

| | | | |
|---|---|---|---|
| 2009/0257380 A1 | 10/2009 | Meier | |
| 2011/0032149 A1 | 2/2011 | Leabman | |
| 2013/0028158 A1* | 1/2013 | Lee | H04W 52/0206 370/311 |
| 2014/0314003 A1* | 10/2014 | Zhou | H04W 48/16 370/329 |
| 2015/0223084 A1* | 8/2015 | Lightstone | H04W 24/08 370/252 |
| 2015/0245370 A1* | 8/2015 | Arogyaswami | H04W 72/121 370/330 |
| 2015/0334613 A1* | 11/2015 | Awad | H04W 36/0094 370/252 |

* cited by examiner

FLEXIBLE RADIO ASSIGNMENT

This application claims the benefit of provisional patent application Ser. No. 62/333,599, filed May 9, 2016. The aforementioned related provisional patent application is herein incorporated by reference in its entirety.

BACKGROUND

The present disclosure relates to radio assignments for access points (APs), and more specifically, to flexible radio assignments for APs that can reduce co-channel interference.

In order to meet today's demands to deliver better Wi-Fi service and fulfill higher throughput requirements, there is a significant increase in density of APs to cover larger areas as compared to a few years ago.

While increase in density of APs is required to meet the aforementioned demands, it brings new challenges in densely populated deployments. For example, radios in multiple APs may transmit signals using the same channel of the same frequency band in the same area which may cause high co-channel interference between the radios. High co-channel interference can negatively affect the performance of the radios in the APs.

SUMMARY

One embodiment of the present disclosure provides a network controller that includes a processor and a memory. The memory contains a program that, when executed on the processor, performs an operation. The operation includes, for each of a plurality of access points, calculating a respective density value indicating respective neighboring access points that are in direct communication with the access point. The operation also includes selecting an access point from the plurality of access points based on the respective densities values, and calculating locations of the respective neighboring access points relative to the selected access point. The operation further includes determining that a radio in the selected access point is redundant based on the calculated locations; and managing the radio in the selected access point to mitigate co-channel interference in a frequency band after determining that the radio is redundant.

One embodiment of the present disclosure provides a computer program product that includes a computer-readable storage medium having computer readable program code embodied therewith. The computer readable program code calculates, for each of a plurality of access points, a respective density value indicating respective neighboring access points that are in direct communication with the access point. The computer readable program code also selects an access point from the plurality of access points based on the respective densities values, and calculates locations of the respective neighboring access points relative to the selected access point. The computer readable program code further determines that a radio in the selected access point is redundant based on the calculated locations; and manages the radio in the selected access point to mitigate co-channel interference in a frequency band after determining that the radio is redundant.

One embodiment of the present disclosure provides a method that includes for each of a plurality of access points, calculating a respective density value indicating respective neighboring access points that are in direct communication with the access point. The method also includes selecting an access point from the plurality of access points based on the respective densities values; and calculating locations of the respective neighboring access points relative to the selected access point. The method further includes determining that a radio in the selected access point is redundant based on the calculated locations; and managing the radio in the selected access point to mitigate co-channel interference in a frequency band after determining that the radio is redundant.

DETAILED DESCRIPTION

One goal of Radio Resource Management (RRM) Transmit Power Control algorithms is to reduce co-channel interference without impacting a radio's effective coverage radius. However, in dense deployments such as at enterprise sites, stadium venues or education institutions, even with standard radio frequency (RF) planning and site surveys, the APs tend to suffer from high co-channel interference. That is, multiple radios in multiple APs tend to transmit signals using the same channel of the same frequency band in the same area of the network. Though the problem is usually seen with 2.4 GHz frequency band, radios using the 5 GHz frequency band can also experience high co-channel interference.

In some instances, a network engineer considers only the 5 GHz frequency band when determining the number and the layout of the APs to provide wireless access for a defined area. The 2.4 GHz frequency band is usually considered as secondary to the 5 GHz frequency band. Because of the lower frequency, wireless signals in the 2.4 GHz frequency band can travel further than wireless signals in the 5 GHz frequency band. Thus, coverage determinations made for the 5 GHz frequency band are not directly applicable to the 2.4 GHz frequency band. Therefore, the 2.4 GHz frequency band is usually configured manually, e.g., a system administrator simply makes an educated guess on how many 2.4 GHz radios are needed to provide sufficient coverage to the defined area. To prevent contention and reduce co-channel interference between radios in multiple APs in the 2.4 GHz frequency band, a system administrator may manually power down some of the 2.4 GHz radios.

However, the above manual method can be cumbersome, tedious, and results in coverage holes. Also, since redundant radios in APs are manually turned off, they will not be reactive to future changes of RF environments such as providing adequate client coverage and adjusting transmitting power when needed. The present disclosure provides a flexible radio assignment algorithm that can reduce co-channel interference caused by redundant radios in APs.

Figure 1:
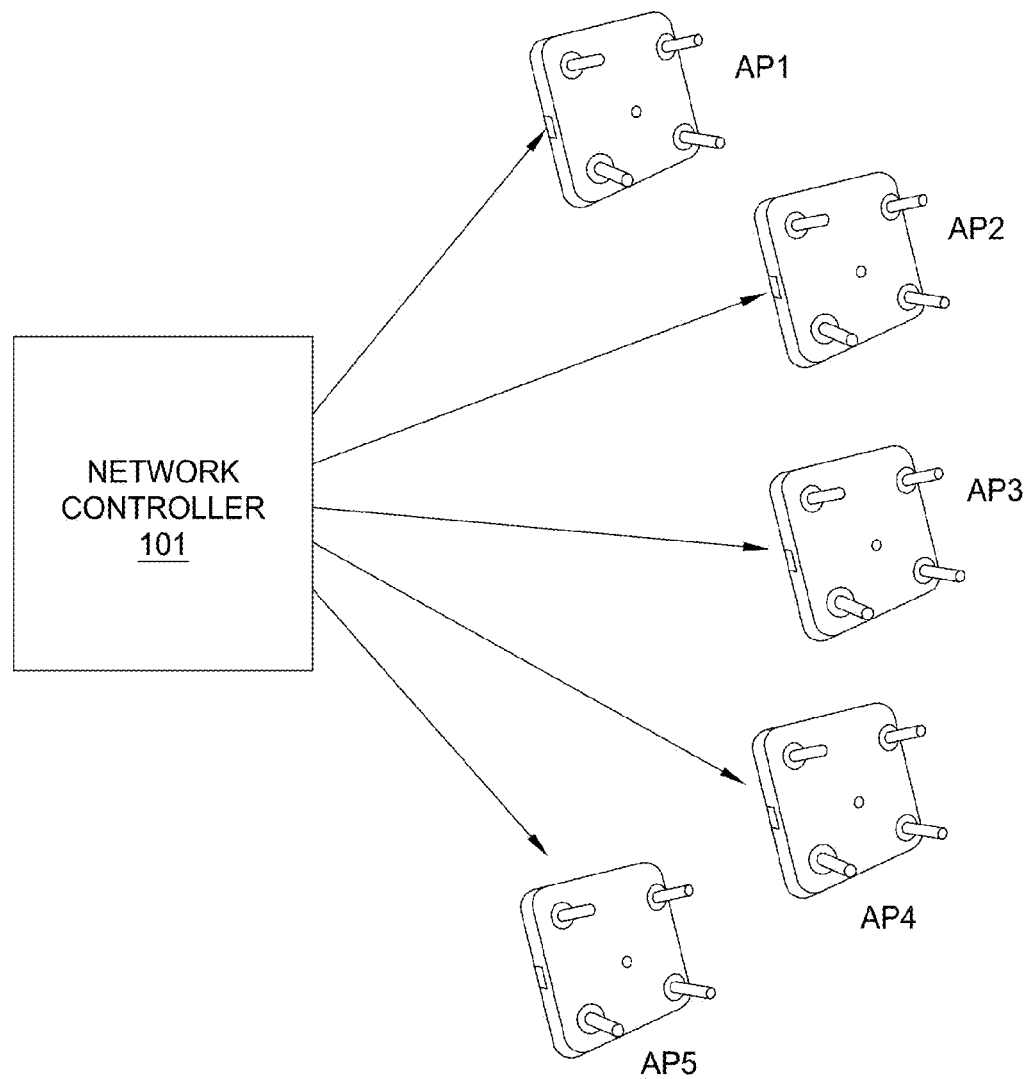
FIG. 1 illustrates a network controller controlling multiple APs in a network, according to one embodiment herein.

FIG. 1 illustrates a network controller controlling a plurality of APs in a network, according to one embodiment herein. In FIG. 1, the network controller 101 controls a plurality of APs from AP1 to AP5. In one embodiment, each AP includes two radios where the first radio is a dedicated 5 GHz radio that transmits signals in the 5 GHz frequency band and the second radio is a XOR radio that can dynamically switch between the 2.4 GHz and 5 GHz frequency bands. That is, the second radio can transmit signals in either the 2.4 GHz frequency band or the 5 GHz frequency band. The two radios in an AP can be active simultaneously on the same frequency band or on different frequency bands. For example, the XOR radio and the dedicated 5 GHz radio in an AP can simultaneously transmit signals in the 5 GHz frequency band by using different channels of the 5 GHz frequency band. In one embodiment, the network controller 101 can be an AP, e.g., a master AP that can control other APs. In another embodiment, the network controller 101 can be a separate computing device.

In one embodiment, the radios in AP1-AP5 have two operation modes, i.e., a local working mode and a monitor role. When operating in the local working mode, the dedicated 5 GHz radio transmits signals dedicatedly in the 5 GHz frequency band and the XOR radio transmits signals in either the 2.4 GHz frequency band or the 5 GHz frequency band. In the monitor role, however, the dedicated 5 GHz radio and the XOR radio do not transmit signals in either the 5 GHz or the 2.4 GHz frequency bands. Also, in the monitor role, the radios consume lower power than in the local working mode. In the monitor role, the radios are passive monitors that can receive signals transmitted on the 5 GHz or the 2.4 GHz frequency bands but do not transmit signals.

The network controller 101 can determine whether a radio in an AP is redundant. That is, the network controller 101 can determine whether an AP's coverage area is already covered sufficiently (fully or almost fully) by at least one radio in a neighboring AP. For example, if AP1's XOR radio transmits signals using a channel of the 2.4 GHz frequency band and if AP2 and AP3's XOR radios also transmit signals using the same channel of the 2.4 GHz frequency band which cover the same area as AP1's XOR radio, then AP1's XOR radio is redundant. In this situation, AP1's redundant XOR radio may cause co-channel interference with AP2 and AP3's XOR radios using the same channel of the 2.4 GHz frequency band.

If the network controller 101 determines that a radio in an AP is redundant in a frequency band, the network controller 101 manages the redundant radio to mitigate co-channel interference in the frequency band, e.g., the network controller 101 prohibits the redundant radio from transmitting signals in the frequency band. In one embodiment, the network controller 101 instructs AP1's XOR radio to switch to the 5 GHz frequency band. That is, the network controller 101 switches AP1's XOR radio to transmit signals in the 5 GHz frequency band, so that AP1's XOR radio does not transmit signals in the 2.4 GHz frequency band, and thus, does not cause co-channel interference in the 2.4 GHz frequency band. In another embodiment, the network controller 101 instructs AP1's XOR radio to change from local working mode to monitor role so that AP 1 's XOR radio does not transmit signals in the 2.4 GHz frequency band and does not cause co-channel interference in that band. In other embodiments, the network controller 101 instructs AP1's XOR radio to change from local working mode to provide wireless service assurance service or Channel Availability Check (CAC) for Zero-Touch Dynamic Frequency Selection (DFS) service or to operate as Client-Aware high availability (HA) Radio in a hot-standby mode.

FIG. 1 illustrates only one embodiment herein. In other embodiments, the network controller may control a different number of APs. In other embodiments, the APs may include a different number of radios. For example, the APs may include a dedicated 5 GHz radio, a dedicated 2.4 GHz radio, and a XOR radio. In other embodiments, the radios of the APs may transmit signals in frequency bands different from the 5 GHz frequency band and the 2.4 GHz frequency band, as understood by an ordinary person in the art.

Figure 2:
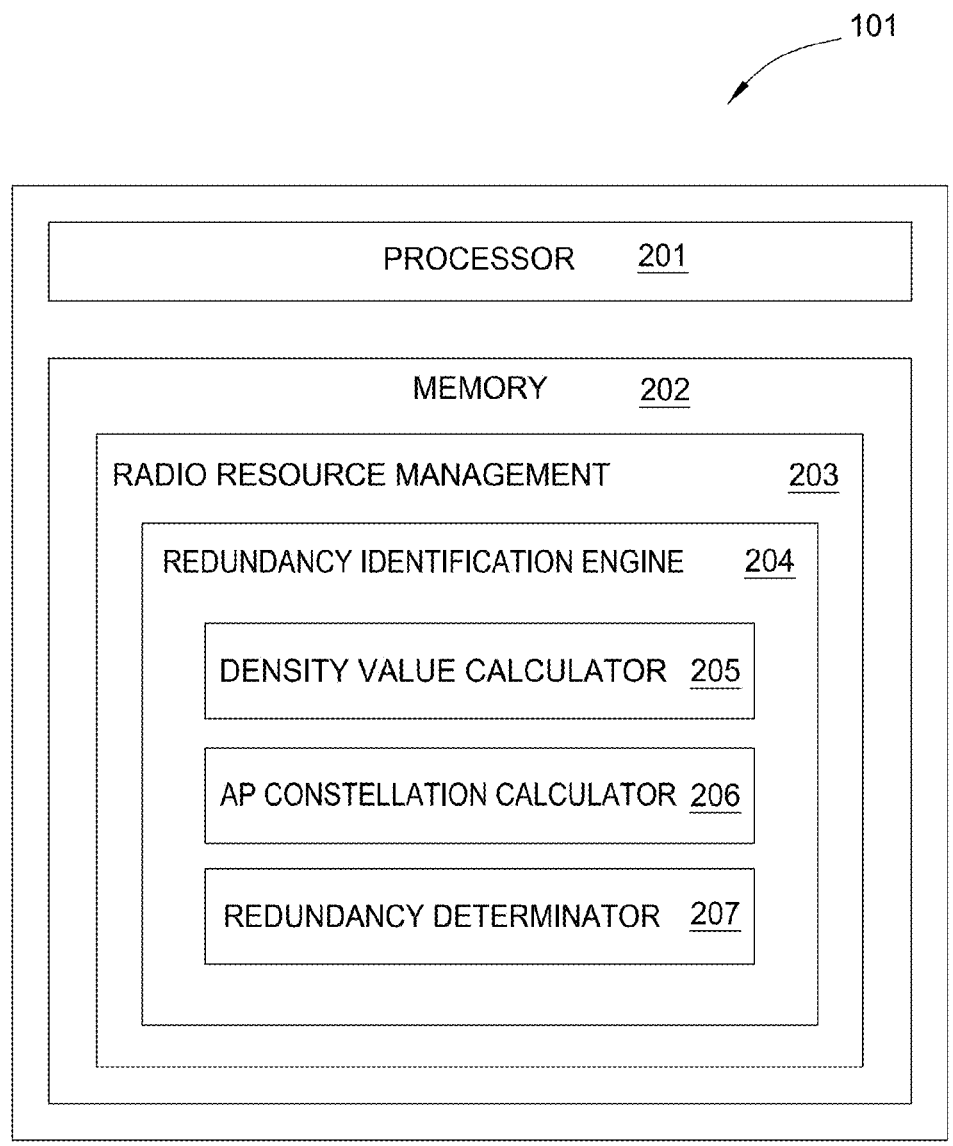
FIG. 2 illustrates a network controller, according to one embodiment herein.

FIG. 2 illustrates the network controller 101, according to one embodiment herein. The network controller 101 includes a processor 201 and a memory 202. The processor 201 may be any computer processor capable of performing the functions described herein. Although memory 202 is shown as a single entity, memory 202 may include one or more memory devices having blocks of memory associated with physical addresses, such as random access memory (RAM), read only memory (ROM), flash memory or other types of volatile and/or non-volatile memory.

The memory 202 includes a radio resource management (RRM) component 203. The RRM component 203 provides a system level management of co-channel interference, radio resources, and other radio transmission characteristics in the network. The RRM component 203 includes core algorithms for controlling parameters such as transmit power, user allocation, beamforming, data rates, handover criteria, modulation scheme, error coding scheme, etc. The RRM component 203 aims to utilize the radio-frequency resources and radio network infrastructure in an efficient way.

In one embodiment, the RRM component 203 receives inter-radio measurement data reported from the APs controlled by the network controller 101. The inter-radio measurement data may include but is not limited to the channel frequency between two radios of different APs and the received signal strength indicator (RSSI) or path loss between two radios of different APs.

In one embodiment, the RRM component 203 performs the inter-radio measurement based on a neighbor discovery protocol (NDP). By using NDP, each radio in each AP sends a broadcast message using a channel to all other radios in all other APs using the same channel. The broadcast message may be a neighbor discovery packet with a predefined packet format. When a radio in an AP receives the neighbor discovery packet, it uses the neighbor discovery packet to obtain the inter-radio measurement data, and forwards the neighbor discovery packet and the inter-radio measurement data to the RRM component 203. Based on the received neighbor discovery packet and the inter-radio measurement data, the RRM component 203 can understand how every radio using a channel hears every other radio using the same channel and how every AP relates to other APs in the network controlled by the network controller 101.

The RRM component 203 includes a redundancy identification engine (RIE) 204. Based on the measurement data received by the RRM component 203, the RIE 204 can identify redundant radios in APs in a frequency band. The RIE 204 includes a density value calculator 205, an AP constellation calculator 206 and a redundancy determinator 207. The density value calculator 205 identifies potential redundant radios in APs, the AP constellation calculator 206 calculates relative locations of neighboring APs, and the redundancy determinator 207 determines whether a radio in an AP is redundant. The operation of the RIE 204 will be described in more detail below.

When a radio in an AP is identified as redundant by the RIE 204, the RRM component 203 manages the redundant radio in the AP to mitigate co-channel interference in a frequency band, e.g., the RRM component 203 sends configuration messages to the AP either to switch the redundant radio to transmit signals in a different frequency band or change the radio into the monitor role. Thus, the redundant radio is prohibited from transmitting signals in the current frequency band, so that co-channel interference caused by the redundant radio is mitigated.

Figure 3:
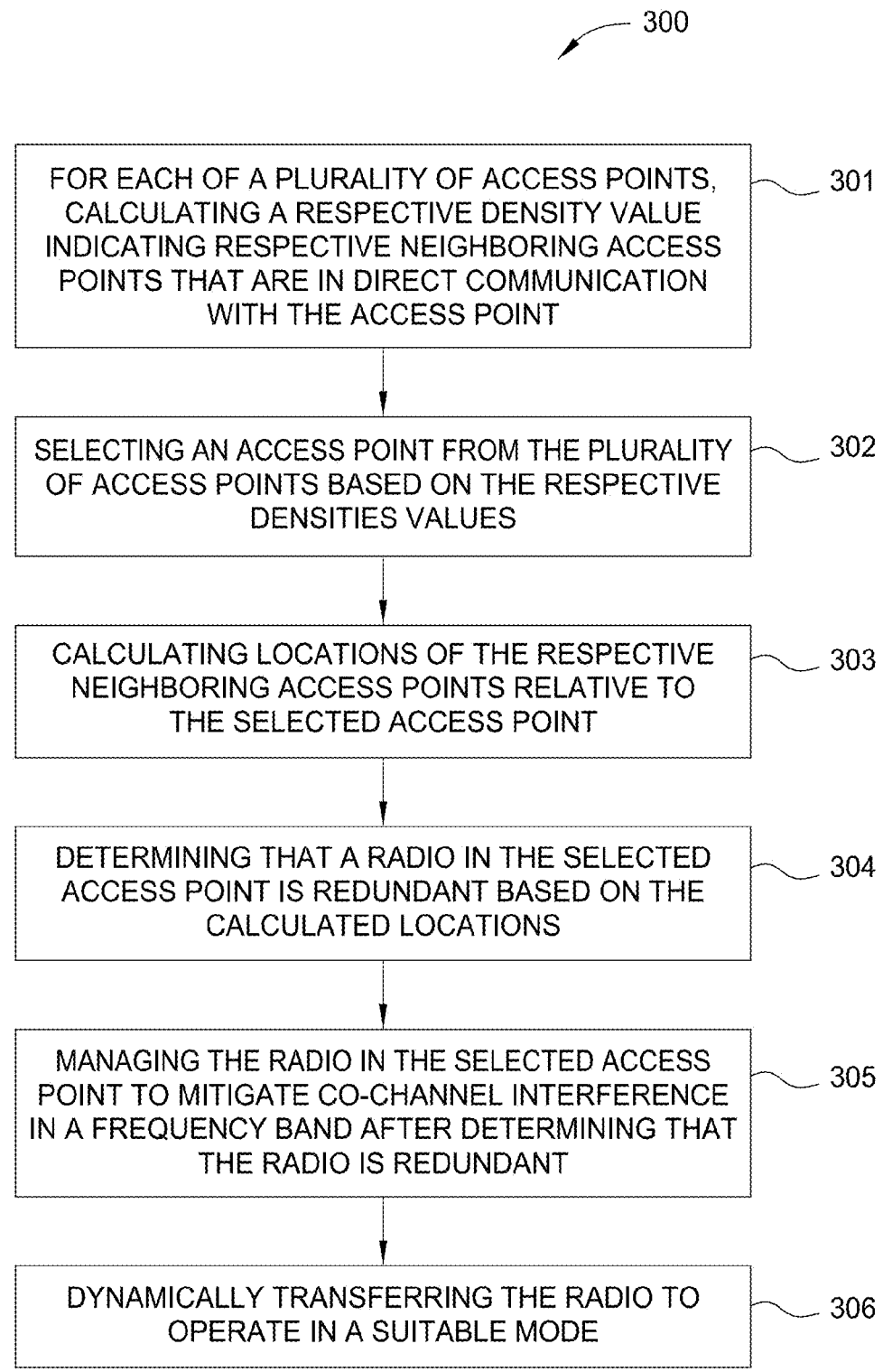
FIG. 3 illustrates a method to implement a flexible radio assignment algorithm, according to one embodiment herein.

FIG. 3 illustrates a method 300 to implement a flexible radio assignment algorithm to APs, according to one embodiment herein. At block 301, the density value calculator 205 204 calculates, for each of a plurality of APs, a respective density value based on neighboring APs that are in direct communication with the AP. In one embodiment, in order to calculate a respective density value indicating respective neighboring APs that are in direct communication with an AP at block 301, the RRM component 203 uses NDP to identify the AP's neighboring APs.

Figure 4:
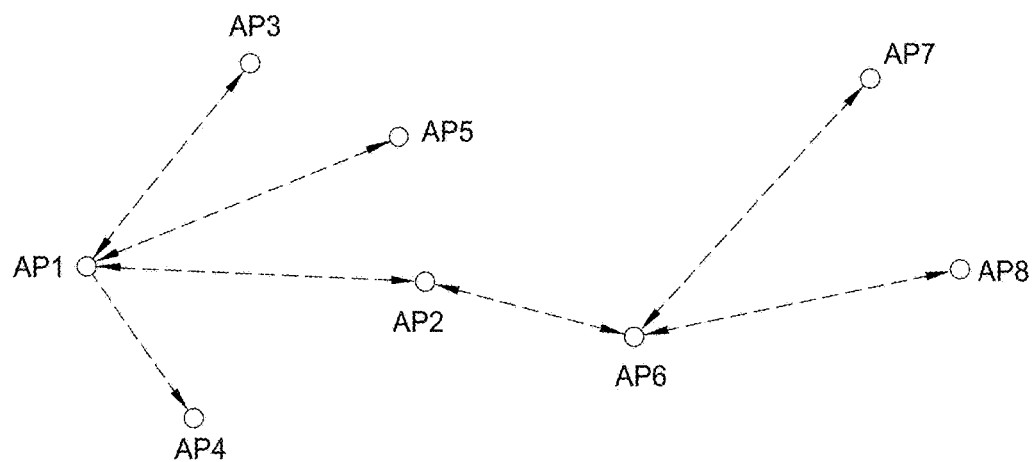
FIG. 4 illustrates a neighborhood including multiple APs, according to one embodiment herein.

FIG. 4 illustrates a neighborhood including multiple APs, according to one embodiment herein. In FIG. 4, AP1 can directly communicate with AP2-AP5. That is, AP2-AP5 are first-hop neighbors of AP1. AP6 on the other hand can directly communicate only with AP2, AP7 and APB, i.e., AP6 has three first-hop neighbors.

Using NDP, an AP sends a broadcast message to all other radios in the neighboring APs using the same band. In one embodiment, when a first-hop neighbor AP receives the neighbor discovery packet, the first-hop neighboring AP forwards the neighbor discovery packet with information indicating that the neighbor discovery packet is directly received from the sending AP to the RRM component 203. In this way, the RRM component 203 can identify the sending AP's first-hop neighboring APs.

In one embodiment, after the first hop neighbors are identified for each AP controlled by the network controller 101, the density value calculator 205 determines a density value, i.e., a Neighbor Density Metric (NDM) value, for the APs. In one embodiment, the NDM value for the i-th AP, i.e., NDM(i), is calculated as:

$$NDM(i) = \sum_{j \in N(i)} \log\left(\frac{1}{PL_{i,j}}\right) = -\sum_{j \in N(i)} PLdB_{i,j}$$

where N(i) are the first-hop neighbors of the i-th AP and $PL_{i,j}$ and $PLdB_{i,j}$ are the path loss between the i-th AP and the j-th AP in decimals and decibels respectively. Here the j-th AP is one of first-hop neighbors of the i-th AP.

Using the equation above, the NDM value for each AP controlled by the network node 101 can be calculated and stored in a Redundancy Determination Candidacy Indicator (RDCI) list. APs listed in the RDCI list are considered as candidate APs that may have redundant radios in a neighborhood. The RDCI list can be sorted, e.g., the AP with the highest NDM value is at the top of the RDCI list and so on. In one embodiment, an AP with a respective NDM value that is below a threshold NDM value is considered as not redundant and may be removed form the RDCI list. In other embodiments, other metrics can be used to calculate the density value for each AP. For example, a simple metric is to calculate the number of first-hop neighbors of an AP as the density value for the AP.

Returning to method 300, at block 302, the density value calculator 205 selects an AP from the plurality of APs based on the respective densities values. In one embodiment, the density value calculator 205 selects the AP with the highest NDM value, i.e., at the top of the RDCI list, as the first candidate AP for redundancy determination. The second and the following candidate APs can be selected based on the respective NDM value similarly, as understood by an ordinary person in the art.

In other embodiments, the density value calculator 205 selects the AP with the highest number of first-hop neighbors as the first candidate AP for redundancy determination. In other embodiments, the density value calculator 205 selects the AP with the highest cumulative RSSI for the first n first-hop neighbors as the first candidate AP for redundancy determination. In another embodiment, the density value calculator 205 selects the AP with the highest cumulative RSSI for the first n first-hop neighbors, where each of the first n first-hop neighbors has a respective RSSI above −75 dBm, as the first candidate AP for redundancy determination.

At block 303, the AP constellation calculator 206 calculates locations of the selected AP's respective neighboring APs relative to the selected AP. In one embodiment, the AP constellation calculator 206 calculates locations of neighboring APs relative to the selected AP, based on the inter-radio measurement data such as the RSSI or path loss between two radios in different APs, as explained above.

Figure 5:
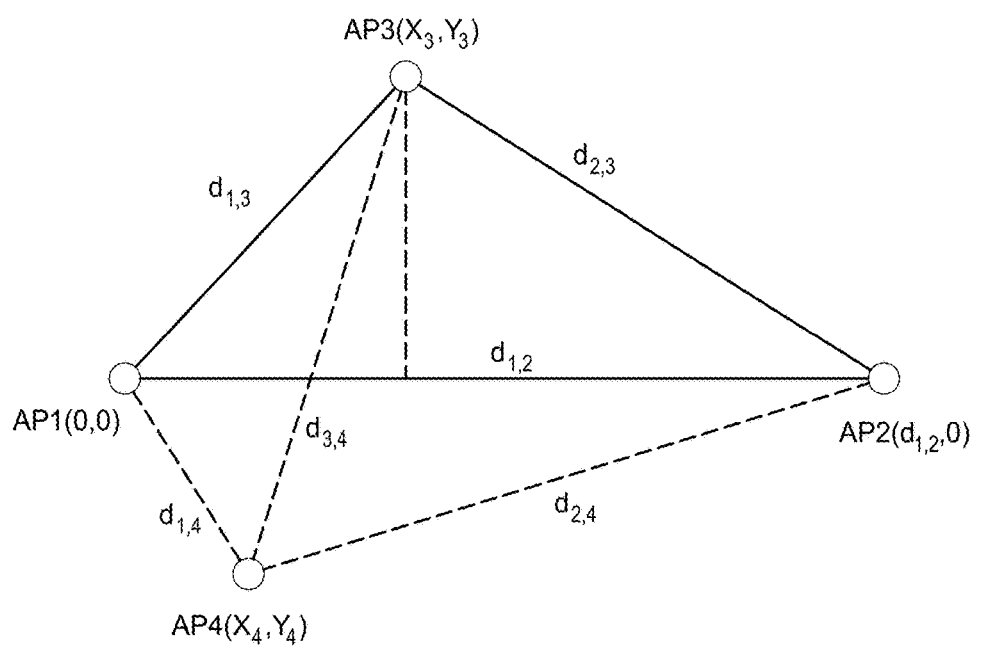
FIG. 5 illustrates a method to calculate relative locations of neighboring APs, according to one embodiment herein.

FIG. 5 illustrates a triangulation-based method to calculate locations of the selected AP's respective neighboring APs relative to the selected AP, according to one embodiment herein. In FIG. 5, AP1 is the selected AP, e.g., the first candidate AP in the RDCI list. AP2-AP4 are the first-hop neighbors of AP1. First, the AP constellation calculator 206 determines locations of AP2 and AP3 relative to AP1. Then, the AP constellation calculator 206 determines the location of AP4 relative to AP1 using the relative locations of AP2 and AP3.

To calculate relative locations of AP2 and AP3 relative to AP1, the AP constellation calculator 206 estimates the distance between each pair of AP1-AP3. That is, the distances between AP1 and AP2, between AP1 and AP3 and between AP2 and AP3. In one embodiment, the inverse of the indoor Okumura-Hata model is used to derive estimated distances between each pair of AP1-AP3. Using this model, the AP constellation calculator 206 can use the RSSI and/or path loss between two radios of each pair of AP1-AP3 to derive estimated distances between each pair of AP1-AP3. As shown in FIG. 5, the estimated distance between AP1 and AP2 is $d_{1,2}$, the estimated distance between AP1 and AP3 is $d_{1,3}$, and the estimated distance between AP2 and AP3 is $d_{2,3}$. In other embodiments, other path loss models as known in the art can be used to derive the estimated distances between each pair of AP1-AP3.

After calculating the distances, without loss of generality, the selected AP—i.e., AP1—is placed on the origin and has a coordinate of (0, 0). The x-axis is defined as the axis that connects AP1 and one of its neighbors, e.g., AP2. Thus, as shown in FIG. 3, AP2 has a coordinate of $(d_{1,2}, 0)$. In this way, the relative location of AP2 is determined. AP3 is assumed to have a positive y-axis value with a coordinate $(X_3, Y_3)$. The AP constellation calculator 206 can solve the following set of equations to determine the values of $X_3$ and $Y_3$:

$$\begin{cases} X_3^2 + Y_3^2 = d_{1,3}^2 \\ (d_{1,2} - X_3)^2 + Y_3^2 = d_{2,3}^2 \end{cases}$$

After calculating $X_3$ and $Y_3$, the relative location of AP3 can be determined.

The AP constellation calculator 206 can also solve the set of equations to find the relative location of AP4 relative to AP1. For example, the distance $d_{1,4}$ between AP1 and AP4, the distance $d_{2,4}$ between AP2 and AP4, and the distance $d_{3,4}$ between AP3 and AP4, are first estimated using the inverse of the indoor Okumura-Hata model. Assuming AP4 has a coordinate $(X_4, Y_4)$, the absolute values of $X_4$ and $Y_4$, i.e., $|X_4|$ and $|Y_4|$, can be calculated based on the above set of equations. The sign of $X_4$ and $Y_4$ can be determined based on the distance $d_{2,4}$ between AP2 and AP4 and the distance $d_{3,4}$ between AP3 and AP4. In this manner, the AP constellation calculator 206 can determine the locations of all the neighboring APs of AP1.

The triangulation-based method as shown in FIG. 5 is only one embodiment to calculate the relative locations of the neighboring APs to the selected AP. Other methods to calculate relative locations as known in the art, e.g., methods using 3D models, can also be used to calculate the relative locations of the neighboring APs to the selected AP. In other embodiments, path loss information from more than one frequency bands can be used in calculating the AP constellation. For example, since the APs have radios operating in both 2.4 GHz and 5 GHz bands, the path loss information of neighboring APs from both of these bands can be utilized in computing the relative locations and the AP constellations.

Returning to method 300, once locations of the selected AP's respective neighboring APs relative to the selected AP are calculated, at block 304, the redundancy determinator 207 determines that a radio in the selected AP is redundant based on the calculated locations. In one embodiment, at block 304, the redundancy determinator 207 determines whether the selected candidate AP has a redundant radio by using a redundancy identification algorithm. Two redundancy identification algorithms are disclosed herein to determine whether the selected candidate AP has a redundant radio.

Figure 6:
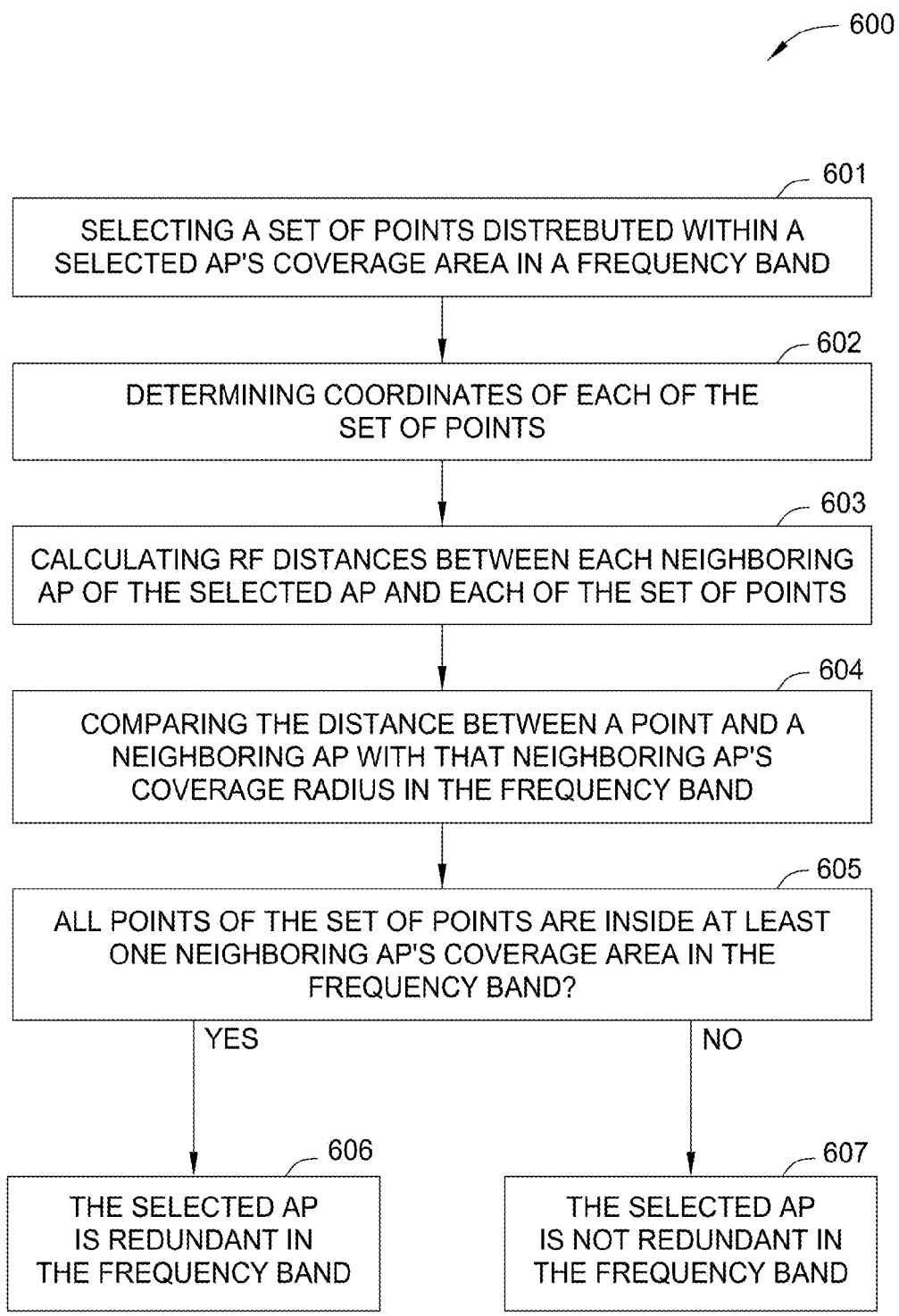
FIG. 6 illustrates a method to implement a first redundancy identification algorithm, according to one embodiment herein.
Figure 7:
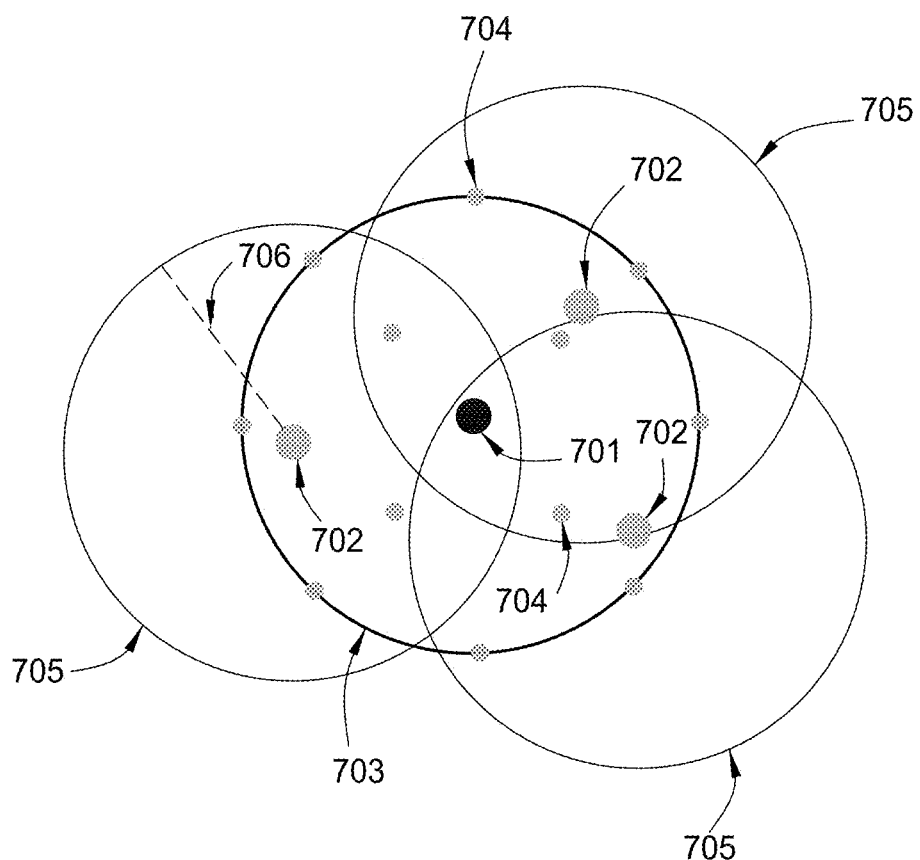
FIG. 7 illustrates a diagram of the first redundancy identification algorithm, according to one embodiment herein.

The first redundancy identification algorithm is multi-point check algorithm and is described using FIGS. 6 and 7. In this algorithm, a selected AP is considered to have a redundant radio if a set of points deterministically and/or uniformly distributed in the selected AP's coverage area are all covered by at least one of the selected AP's neighboring APs.

FIG. 6 illustrates a method 600 for performing the multi-point check algorithm, according to one embodiment herein.

At block 601, the redundancy determinator 207 selects a set of points distributed within a coverage area of the selected AP in a frequency band.

In one embodiment, at block 601, the redundancy determinator 207 selects a set of 13 points. FIG. 7 illustrates the multi-point check algorithm using a 13-point distribution (including the origin), according to one embodiment herein. As shown in FIG. 7, a selected AP 701, e.g., the first candidate AP in the RDCI list, is located at the origin with the coordinate (0, 0) and another three neighboring APs 702 are located nearby. Each of the selected AP 701 and the neighboring APs 702 has two radios, as described above. A coverage circle 703 indicates the coverage area of the selected AP 701's XOR radio in the 2.4 GHz frequency band. Similarly, the three neighboring APs 702's coverage circles are denoted as 705, which indicate the coverage areas of the three neighboring APs 702's XOR radios in the 2.4 GHz frequency band. The redundancy determinator 207 selects the origin and also selects another 12 points in the coverage circle 703. As shown in FIG. 4, the redundancy determinator 207 selects 8 points uniformly distributed on the coverage circle 703 and another 4 points uniformly distributed inside the coverage circle 703. For simplicity of illustration, only two of the 12 points are denoted as 704.

Returning to method 600, once the set of points is selected, at block 602, the redundancy determinator 207 determines coordinates of each of the set of points. In the embodiment as shown in FIG. 7, the redundancy determinator 207 determines the coordinates of each of the 12 points 704 relative to the origin (the origin's coordinate is known as (0,0)). In one embodiment, the redundancy determinator 207 calculates the coordinates of each of the 12 points 704 relative to the origin based on the distances of each of the 12 points 704 relative to the origin and the uniform distribution of the 12 points.

At block 603 in FIG. 6, the redundancy determinator 207 calculates RF distances between each neighboring AP of the selected candidate AP and each of the set of points. In the embodiment as shown in FIG. 7, the redundancy determinator 207 calculates the distances between each neighboring AP 702 and each of the 13 points (the 12 points 704 and the origin), based on the coordinates of each neighboring AP 702 and the coordinates of each of the 13 points. In one embodiment, the AP constellation calculator 206 calculates the coordinates of each neighboring AP 702 relative to the origin using the above triangulation-based method, as described above. For each of the three neighboring APs 702, the redundancy determinator 207 calculates the distances between the neighboring AP 702 and each of the 13 points.

Returning to method 600, once distances between each neighboring AP of the selected candidate AP and each of the set of points are calculated, at block 604, the redundancy determinator 207 compares the distance between a point and a neighboring AP with that neighboring AP's coverage radius in the frequency band. In the embodiment as shown in FIG. 7, the redundancy determinator 207 compares the distance between a point 704 and a neighboring AP 702 with that neighboring AP 702's coverage radius in a frequency band. A neighboring AP 702's coverage radius is the radius of that neighboring AP 702's coverage circle 705, denoted as 706.

Based on the comparisons in block 604, at block 605, the redundancy determinator 207 determines whether all points of the set of points are inside at least one neighboring AP's coverage area in the frequency band. Referring to FIG. 7, if the distance between a point 704 and a neighboring AP 702 is less than that neighboring AP 702's coverage radius 706 in a frequency band, the redundancy determinator 207 determines that the point 704 is inside the neighboring AP 702's coverage area in the frequency band. In this way, the redundancy determinator 207 determines whether all the 13 points are inside one or more neighboring APs 702's coverage area in the frequency band.

If the answer at block 605 is "yes", at block 606, the redundancy determinator 207 determines that the selected candidate AP is redundant in the frequency band, i.e., the selected candidate AP has a redundant radio in the frequency band. In the embodiment as shown in FIG. 7, all the 13 points 704 are inside at least one neighboring AP 702's coverage circle 705. The selected AP 701's coverage area in the frequency band is considered as fully covered by one or more of its neighboring APs 702. Thus, the radio in the selected AP 701 transmitting signals in the frequency band is determined as redundant in the 2.4 GHz frequency band.

If the answer at block 605 is "no", at block 607, the redundancy determinator 207 determines that the selected candidate AP is not redundant in the frequency band. In the embodiment as shown in FIG. 7, if not all the 13 points are inside at least one neighboring AP 702's coverage circle 705, the selected AP 701's coverage area in the frequency band is not considered as fully covered by one or more of its neighboring APs 702. Thus, the redundancy determinator 207 determines that the selected AP 701's XOR radio is not redundant in the 2.4 GHz frequency band.

After determining that the selected AP has a redundant radio, the redundancy determinator 207 implements the multi-point check algorithm to determine whether the next candidate AP in the RDCI list is redundant and so on. In one embodiment, when the selected AP is determined as redundant by the multi-point check algorithm, the selected AP is removed from the RDCI list.

In order to improve robustness and flexibility to the multi-point check algorithm, in one embodiment, the redundancy determinator 207 determines whether a certain number (not all) of points of the set of points are inside at least one neighboring AP's coverage area in the frequency band. That is, the determinator 207 checks all the points and can nonetheless determine that the radio in the selected AP 701 is redundant if a threshold number (but not all) of the set of points are inside a neighboring AP's coverage area in the frequency band. In another embodiment, a mathematical expression can be introduced to indicate how well the circle is covered, e.g., fully covered or almost fully covered. In one embodiment, the mathematical expression is defined as: (percentage of points in circle fully covered)+$\alpha$×(percentage of points in circle covered with an additional margin based on their proximity to the origin), where a is a coefficient and $0<\alpha<1$.

FIG. 7 only illustrates one embodiment of the multi-point check algorithm. In other embodiments, a different number of points may be used. In other embodiments, the multiple points may be distributed at different locations on or inside the selected AP's coverage circle. In other embodiments, the coverage circles may indicate different coverage areas, e.g., the XOR radios' coverage area in the 5 GHz frequency band.

Figure 8:
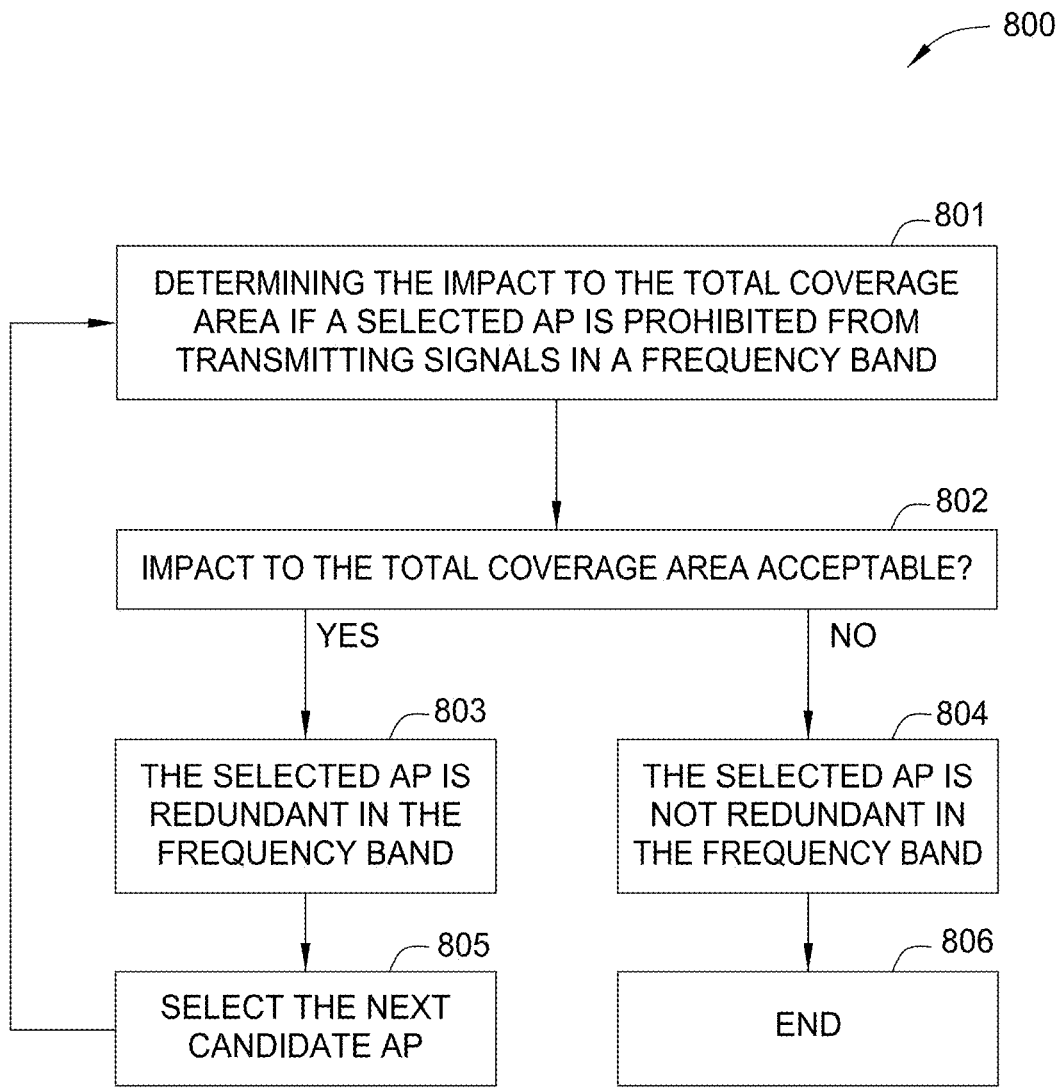
FIG. 8 illustrates a method to implement a second redundancy identification algorithm, according to one embodiment herein.
Figure 9:
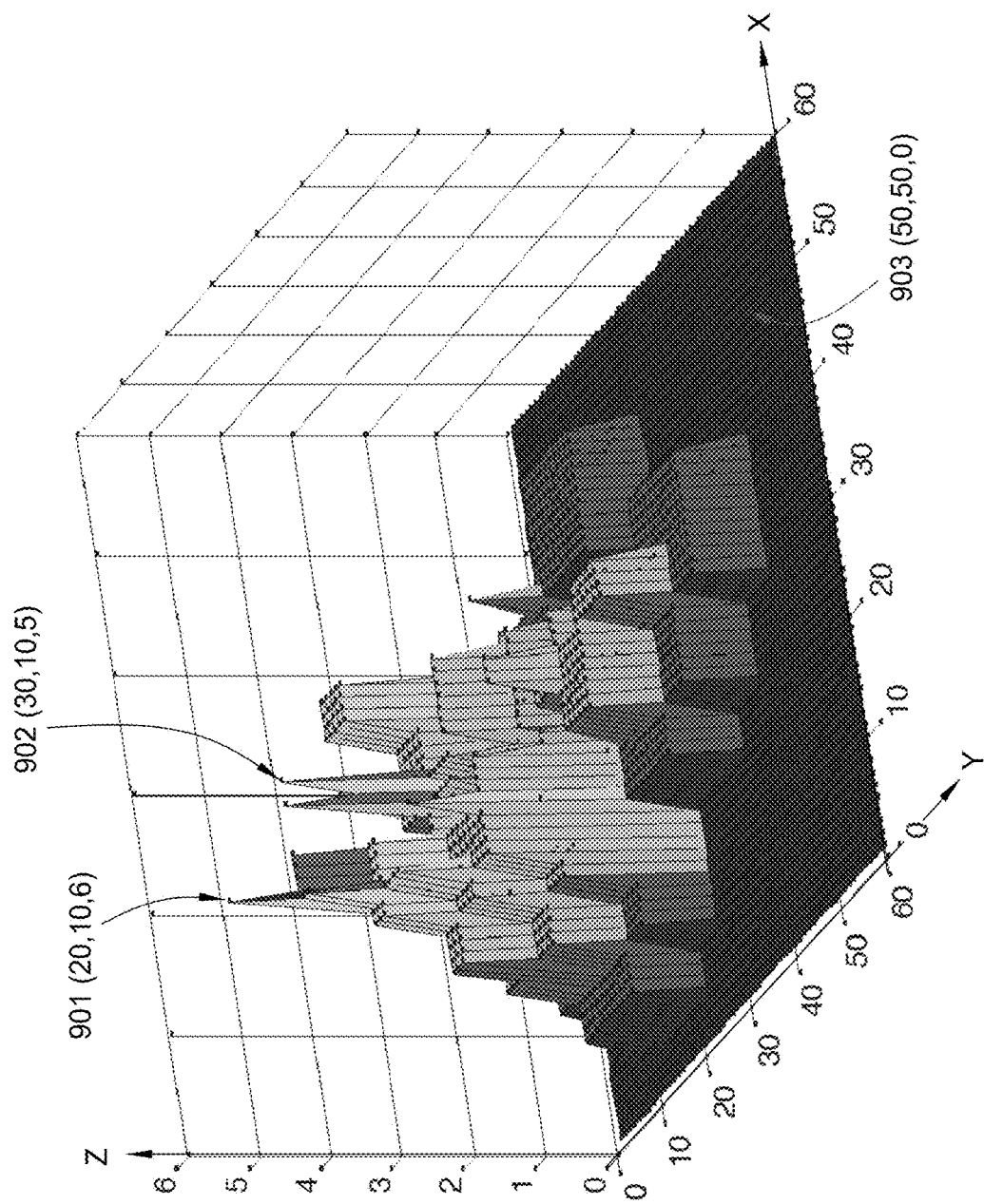
FIG. 9 illustrates a visualized simulation of the second redundancy identification algorithm, according to one embodiment herein.
Figure 10:
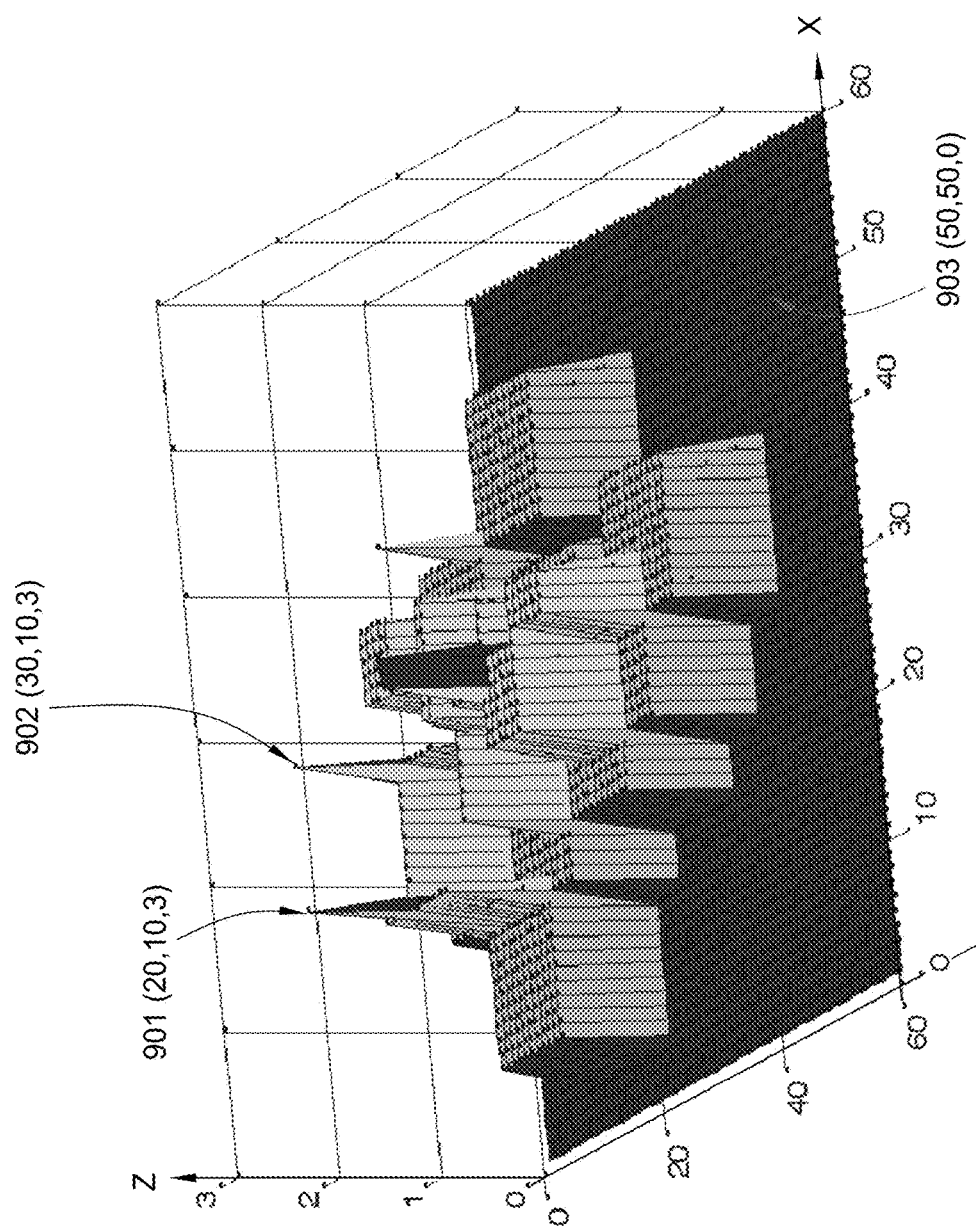
FIG. 10 illustrates simulation results of the second redundancy identification algorithm, according to one embodiment herein.

The second redundancy identification algorithm that may be performed at block 304 of FIG. 3 is coverage peak flattening algorithm that is described using FIGS. 8-10. FIG. 8 illustrates a method 800 to implement the coverage peak flattening algorithm, according to one embodiment herein. At block 801, the redundancy determinator 207 determines the impact to the total coverage area if a selected AP, e.g., the candidate AP with the highest density value, is prohibited from transmitting signals in a frequency band. The total coverage area includes the area that is covered by at least one radio in the APs in the network.

If the total coverage area does not change, even after disabling the selected AP in the frequency band then it indicates that indicates that the selected candidate AP's coverage area in the frequency band is fully covered by at least one of its neighboring APs. On the other hand, if the selected candidate AP is prohibited from transmitting signals in a frequency band and the total coverage area is reduced, this indicates that the selected candidate AP's coverage area in the frequency band is not fully covered by at least one of its neighboring APs.

In one embodiment, in order to determine the impact to the total coverage area if a selected AP is prohibited from transmitting signals in a frequency band, the network controller can model the total coverage area and simulate the impact to the total coverage area if a selected AP is prohibited from transmitting signals in a frequency band. The redundancy determinator 207 determines whether the selected AP has a redundant radio in the frequency band, based on the simulation results. In another embodiment, the total coverage area can be modeled and the impact to the total coverage area can be simulated by a separate computing system. The separate computing system can transmit the simulation results of the impact to the total coverage area to the network controller 101 to determine whether the selected AP has a redundant radio in the frequency band.

FIG. 9 illustrates a visualized simulation of the coverage peak flattening algorithm, according to one embodiment herein. FIG. 9 shows a model of a 60 meter×60 meter area with X, Y and Z axes. As shown in FIG. 9, a location in the 60 meter×60 meter area is denoted by its coordinates in X axis and Y axis, and number of APs that cover the location in a frequency band is denoted by its coordinate in Z axis. For example, 901 denotes a location at (20, 10) which is covered by 6 APs in a frequency band, e.g., there are six radios in six APs that are transmitting signals in the 2.4 GHz frequency band. Thus, the coordinate at 901 is (20, 10, 6). Similarly, 902 denotes a location at (30, 10) which is covered by 5 APs in the frequency band. Thus, the coordinate at 902 is (30, 10, 5). Also, 903 denotes a location at (50, 50) which is not covered by any AP in the frequency band. Thus, the coordinate at 903 is (50, 50, 0).

The simulation of coverage peak flattening algorithm starts from a selected AP that covers location 901 because the selected AP that covers location 901 has the highest density value (peak), i.e., the highest number of APs (6 APs) that cover location 901 in a frequency band. In one embodiment, the selected AP can be the first candidate AP in the RDCI list. In the simulation, the selected AP that covers location 901 is prohibited from transmitting signals in the frequency band. The simulation results determine whether the total coverage area is changed.

Returning to method 800, once the simulation for the selected AP is finished, at block 802, the redundancy determinator 207 determines whether the impact to the total coverage area is acceptable. In one embodiment, if the total coverage area satisfies a threshold, the impact to the total coverage area is considered as acceptable. For example, the threshold can be a tolerance factor: $\tau$, which indicates that the current total coverage area after prohibiting the selected candidate AP from transmitting signals in the frequency band is $\tau$%, e.g., 90%, of the original total coverage area before prohibiting the selected candidate AP from transmitting signals in the frequency band.

If the impact to the total coverage area is acceptable at block 802, e.g., the current total coverage area is at least $\tau$% of the original total coverage area, at block 803, the redundancy determinator 207 determines that the selected candidate AP is redundant in the frequency band, i.e., the selected candidate AP has a redundant radio in the frequency band.

As shown in FIG. 9, if the impact to the total coverage area is acceptable, the selected AP that covers location 901 is determined as redundant and removed from the simulation. That is, after one simulation, the coordinate at 901 is changed from (20, 10, 6) to (20, 10, 5).

At block 805, the redundancy determinator 207 selects the next candidate AP, e.g., the candidate AP with the second highest density. Then the method 800 in FIG. 8 returns to block 801 to implement the coverage peak flattening algorithm for the next candidate AP and so on. Thus, coverage peak flattening algorithm can be implemented recursively.

On the other hand, if the impact to the total coverage area is not acceptable at block 802, e.g., the current total coverage area is below τ% of the original total coverage area, the method 800 proceeds to block 804 where the redundancy determinator 207 determines that the selected AP is not redundant in the frequency band. When the coverage peak flattening algorithm is implemented until the impact to the total coverage area is not acceptable, e.g., the threshold is reached, the coverage peak flattening algorithm ends at block 806.

In one embodiment, the simulation runs recursively until the impact to the total coverage area is not acceptable. In each iteration of the simulation, a selected AP that covers a location in the 60 meter×60 meter area is prohibited from transmitting signals in a frequency band. When the coverage peak flattening algorithm is implemented multiple times until the impact to the total coverage area is not acceptable, e.g., the threshold is reached, multiple APs may be determined as redundant and are removed from the simulation. Accordingly, the coordinates at different locations may be changed when the simulation is ended.

FIG. 10 illustrates the simulation results of the coverage peak flattening algorithm, according to one embodiment herein. As shown in FIG. 10, when the simulation is ended at block 806, the coordinate at 901 is (20, 10, 3), which indicates that 3 APs are required to cover location 901 to satisfy the acceptable total coverage area, i.e., 3 APs among the original 6 APs that cover location 901 are determined as redundant. Also, when the method 800 in FIG. 8 has ended, the coordinate at 902 is (30, 10, 3) which indicates that 3 APs are required to cover location 902 to satisfy the acceptable total coverage area, i.e., 2 APs among the original 5 APs that cover location 902 are determined as redundant. Thus, the number of APs that cover a same location in the 60 meter×60 meter area is reduced, i.e., the density value (peak) is flattened. Using the method 800 in FIG. 8, the redundancy determinator 207 can determine which APs are redundant based on the simulation results and remove the redundant APs from the RDCI list.

In United States, the 2.4 GHz frequency band has only 3 non-overlapping channels while the 5 GHz frequency band has 25 non-overlapping channels. That is, radios in the 2.4 GHz frequency band are more likely to be redundant and cause co-channel interference. Because of this, the RIE 204 may have an additional bias factor for the 2.4 GHz frequency band. That is, the RIE 204 inclines to determine a radio transmitting signals in the 2.4 GHz frequency band as a redundant radio, compared to a radio transmitting signals in the 5 GHz frequency band with a similar density value, e.g., a similar NDM value.

Returning to method 300, once a radio in the selected AP is identified as redundant in a frequency band at block 304, e.g., by using the multi-point check algorithm or the coverage peak flattening algorithm, at block 305, the RRM component 203 manages the redundant radio in the selected AP to mitigate co-channel interference in the frequency band, e.g., the RRM component 203 prohibits the redundant radio in the selected AP from transmitting signals in the frequency band.

In one embodiment, in order to prohibit the redundant radio in the selected AP from transmitting signals in the frequency band, either the redundant radio is switched to transmit signals in a different frequency band or the redundant radio is changed to the monitor role. Specifically, once a radio in an AP is identified as redundant by the RIE 204, the RRM component 203 sends configuration messages to the AP either to switch the redundant radio to transmit signals in a different frequency band or change the radio into a monitor role.

If an XOR radio of an AP that is transmitting signals in the 2.4 GHz frequency band is determined as a redundant radio, the RRM component 203 can either switch the XOR radio to transmit signals in the 5 GHz frequency band or change the XOR radio into the monitor role depending on the users' requirements or the usages of the network. For example, the RRM component 203 can switch the XOR radio to transmit signals in the 5 GHz frequency band to serve more users in the 5 GHz frequency band, or the RRM component 203 can change the XOR radio into the monitor role to reduce power consumption of the AP. Because the redundant XOR radio is no longer transmitting signals in the 2.4 GHz frequency band, the redundant XOR radio does not cause co-channel interference in the 2.4 GHz frequency band.

In one embodiment, when users in the 2.4 GHz frequency band are associated with a weaker RSSI or in case that an neighboring 2.4 GHz radio does not work properly, the RRM component 203 can revert the XOR radio back to the 2.4 GHz frequency band to transmit signals in the 2.4 GHz frequency band to avoid coverage holes in the 2.4 GHz frequency band. When the XOR radio is reverted back to the 2.4 GHz frequency band, the XOR radio will be ignored in future redundancy identification for a time period, e.g., the next 60 minutes, in order to avoid pinning affect.

Similarly, if an XOR radio that is transmitting signals in the 5 GHz frequency band is identified as a redundant radio, the RRM component 203 can either switch the XOR radio to transmit signals in the 2.4 GHz frequency band or change the XOR radio into the monitor role depending on the users' requirements or the usages of the network. Because the redundant XOR radio is no longer transmitting signals in the 5 GHz frequency band, the redundant XOR radio does not cause co-channel interference in the 5 GHz frequency band.

If a dedicated 5 GHz radio is transmitting signals in the 5 GHz frequency band is determined as a redundant radio, the RRM component 203 can change the dedicated 5 GHz radio into the monitor role or power down the radio.

After the RRM component 203 manages the radio in the selected AP to mitigate co-channel interference in the frequency band, e.g., by prohibiting the redundant radio from transmitting signals in the frequency band, at block 306, the RRM component 203 dynamically transfers the radio to operate in a suitable operation mode, based on the users' requirements and/or the network conditions.

In one embodiment, when RIE 204 of the network controller 101 identifies set of radios as redundant, RRM 203 of the network controller 101 utilizes channel, power and client optimization algorithms to evaluate RF conditions, available channel sets and client density in order to determine how to operate the redundant radios.

Figure 11:
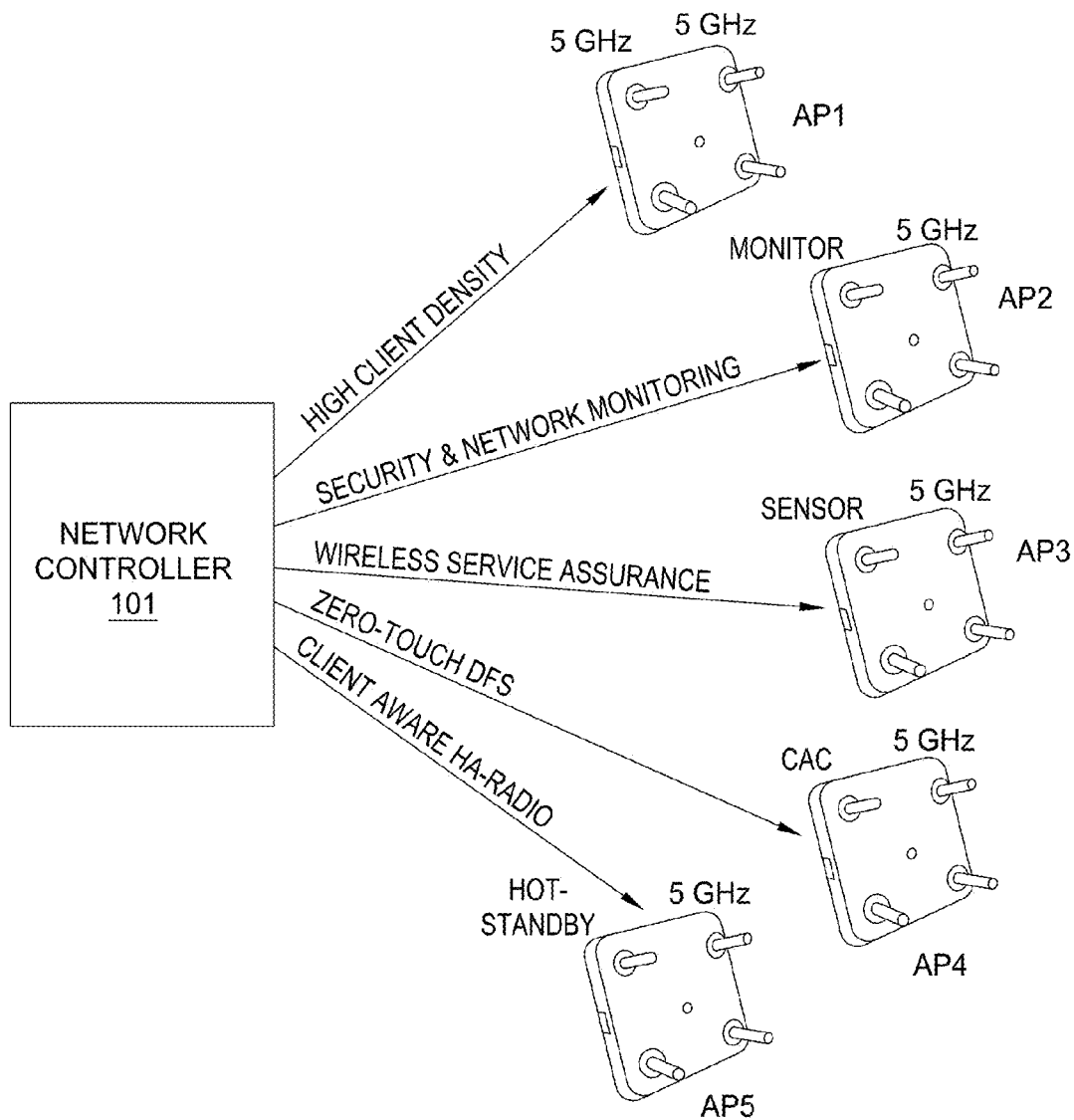
FIG. 11 illustrates a network controller controlling multiple radios to operate in different modes, according to one embodiment herein.

FIG. 11 illustrates that the network controller 101 controls multiple redundant XOR radios in 2.4 GHz frequency band to operate in different operation modes, according to one embodiment herein. In FIG. 11, the XOR radios in AP1-AP5 are determined as redundant radios in 2.4 GHz frequency band. RRM 203 of the network controller 101 sends different configuration messages to different redundant XOR radios to instruct the redundant XOR radios to operate in different modes. For examples, the XOR radio in AP1 is switched to transmit signals in 5 GHz frequency band due to high client density in 5 GHz frequency band. The XOR radio in AP2 is changed to the monitor role to perform security and network monitoring. The XOR radio in AP3 is operated as a spectrum sensor to provide wireless service assurance service. The XOR radio in AP4 is operated to provide Channel Availability Check (CAC) for Zero-Touch Dynamic Frequency Selection (DFS) service. The XOR radio in AP5 is operated as Client-Aware high availability (HA) Radio in a hot-standby mode. In other embodiments, the network controller 101 can control the redundant XOR radios to operate in other modes, as understood by an ordinary person in the art. Thus, the flexible radio assignment algorithm enables dynamic configurations to redundant XOR radios based on evaluations of RF conditions, available channel sets and client density in the network.

Figure 12:
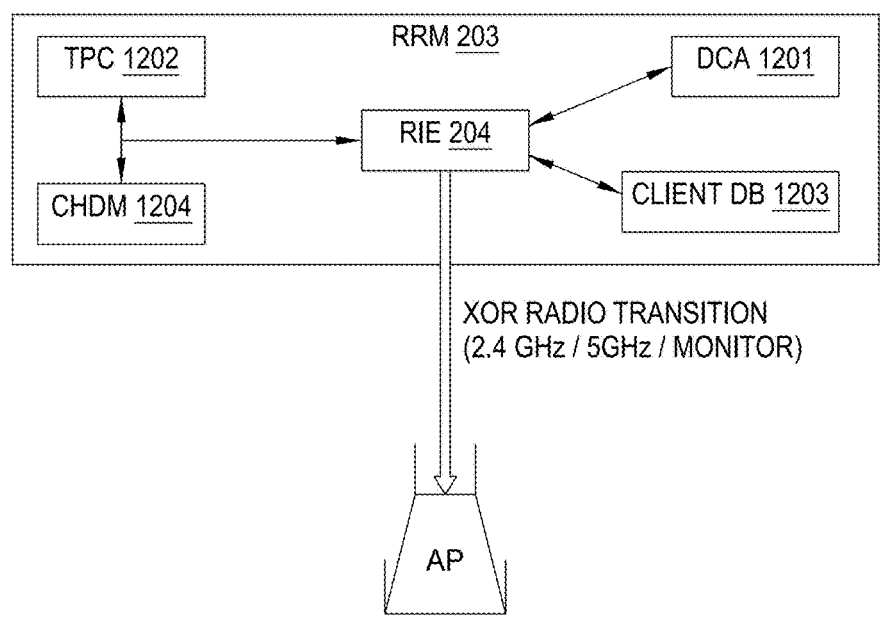
FIG. 12 illustrates interactions between a redundancy identification engine and core algorithms of radio resource management, according to one embodiment herein.

FIG. 12 illustrates interactions between the RIE 204 and core algorithms of RRM 203, according to one embodiment herein. As shown in FIG. 12, RIE 204 can communicate with Dynamic Channel assignment (DCA) algorithm 1201 and Transmit Power Control (TPC) algorithm 1202 of RRM 203 in order to ensure that all identified redundant radios are not taken into considerations for subsequent implementations of DCA/TPC algorithms. Also, client database information 1203 is sent to RIE 204 to estimate required coverage capacity for a given area. Triggers from TPC algorithm 1202 and Coverage Hole Detection and Mitigation (CHDM) algorithm 1204 indicate whether a redundant XOR radio shall continue to operate in monitor role or 5 GHz mode or should revert back to 2.4 GHz mode when there is a potential coverage hole in the 2.4 GHz frequency band.

In one embodiment, once the XOR radio of an AP is determined as redundant in the 2.4 GHz frequency band, DCA algorithm 1201 computes the best channels and channel width in the 5 GHz frequency band for the two radios in the AP. Due to the close proximity between the XOR radio and the dedicated 5 GHz radio, for density-optimized channelization, DCA algorithm 1201 allocates the best channel to the dedicated 5 GHz radio and the second best channel to the XOR radio.

In one embodiment, in order to expedite network convergence, the flexible radio assignment algorithm can be triggered during the first RRM aggressive cycle and the algorithm continues to aggressively optimize coverage zones for the duration of the aggressive state. During the aggressive state, the flexible radio assignment algorithm runs with a default RRM interval. Once network convergence is reached, the flexible radio assignment algorithm will be running at fixed configurable interval. In order to avoid multiple XOR radios getting transferred into 5 GHz frequency band or monitor role, in one iteration of implementing the flexible radio assignment algorithm, only one XOR radio in an AP within the RDCI list can be marked as redundant.

Figure 13:
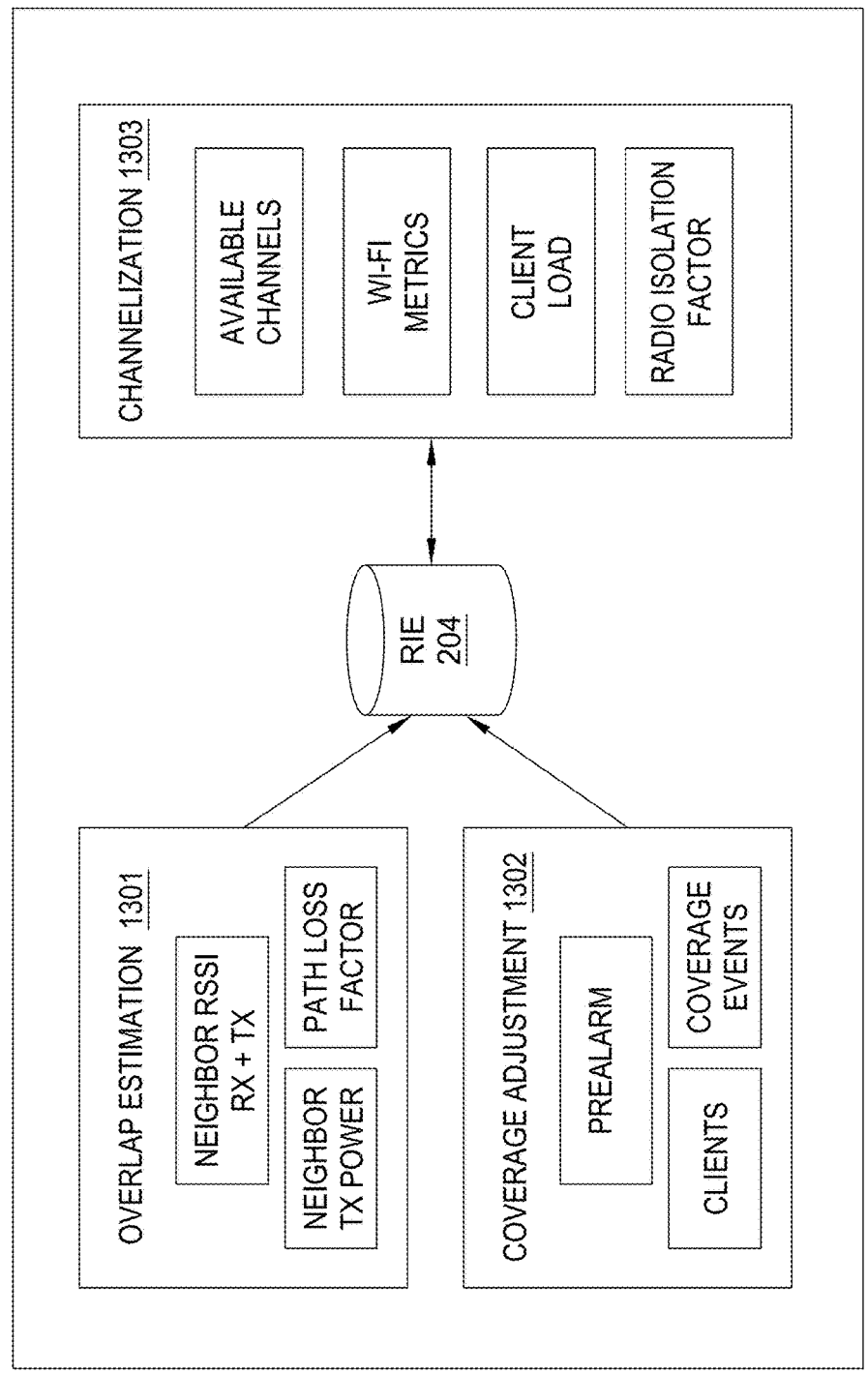
FIG. 13 illustrates inputs to a redundancy identification engine, according to one embodiment herein.

FIG. 13 illustrates inputs to the RIE 204, according to one embodiment herein. The first input to the RIE 204 includes overlap estimation 1301 of APs in a neighborhood. Overlap estimation 1301 includes RSSI between neighboring APs, transmit power from neighboring APs and path loss factors between neighboring APs. The second input to the RIE 204 includes coverage adjustment 1302 to the network. Coverage adjustment 1302 includes pre-alarm to potential coverage holes in the network, information of clients that are trying to access the network or have accessed the network, and coverage events such as increased network load. The third input to the RIE 204 includes channelization 1303. Channelization 1303 includes available channel, Wi-Fi metrics to calculate density values, client load and radio isolation factor. Based on these inputs, RIE 204 can determine whether a radio in an AP is redundant in a frequency band.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A network controller, comprising: a processor; a memory containing a program that, when executed on the processor, performs an operation, the operation comprising: for each of a plurality of access points, calculating a respective density value based on a number of respective neighboring access points that are in direct communication with the access point and based on a path loss between the access point and at least one of the respective neighboring access points; selecting an access point from the plurality of access points based on the respective densities values; calculating locations of the respective neighboring access points relative to the selected access point; determining that a radio in the selected access point is redundant based on the calculated locations; and managing the radio in the selected access point to mitigate co-channel interference in a frequency band after determining that the radio is redundant
wherein calculating locations of the respective neighboring access points comprising calculating the locations as a function of a path loss in a first and second frequency band of the at least one of the respective neighboring access points; and wherein the first and secondary frequency bands are different.

2. The network controller of claim 1, wherein the radio in the selected access point comprises a XOR radio configured to dynamically switch between the frequency band and a different frequency band.

3. The network controller of claim 2, wherein the operation further comprises switching the radio in the selected access point to transmit signals in the different frequency band after determining that the radio is redundant.

4. The network controller of claim 2, wherein the frequency band comprises a 2.4 GHz Wi-Fi frequency band and the different frequency band comprises a 5 GHz Wi-Fi frequency band.

5. The network controller of claim 1, wherein determining that the radio in the selected access point is redundant based on the calculated locations comprises:
determining that coverage area of the radio in the frequency band is covered by at least one of the respective neighboring access points of the selected access point.

6. The network controller of claim 1, wherein the operation further comprises prohibiting the radio in the selected access point from transmitting signals in the frequency band.

7. The network controller of claim 1, wherein the operation further comprises dynamically transferring the radio to operate in one of a plurality of operation modes.

8. A computer program product, comprising: a non-transitory computer-readable storage medium having computer readable program code embodied therewith, the computer readable program code comprising: computer readable program code configured to, for each of a plurality of access points, calculate a respective density value based on a number of respective neighboring access points that are in direct communication with the access point and based on a path loss between the access point and at least one of the respective neighboring access points; computer readable program code configured to select an access point from the plurality of access points based on the respective densities values; computer readable program code configured to calculate locations of the respective neighboring access points relative to the selected access point; computer readable program code configured to determine that a radio in the selected access point is redundant based on the calculated locations; and computer readable program code configured to manage the radio in the selected access point to mitigate co-channel interference in a frequency band after determining that the radio is redundant
wherein calculating locations of the respective neighboring access points comprises calculating the locations as a function of a path loss in a first and second frequency band of the at least one of the respective neighboring access points; and
wherein the first and second frequency bands are different.

9. The computer program product of claim 8, wherein the radio in the selected access point comprises a XOR radio configured to dynamically switch between the frequency band and a different frequency band.

10. The computer program product of claim 9, further comprising computer readable program code configured to switch the radio in the selected access point to transmit signals in the different frequency band after determining that the radio is redundant.

11. The computer program product of claim 9, wherein the frequency band comprises a 2.4 GHz Wi-Fi frequency band and the different frequency band comprises a 5 GHz Wi-Fi frequency band.

12. The computer program product of claim 8, further comprising computer readable program code configured to determine that coverage area of the radio in the frequency band is covered by at least one of the respective neighboring access points of the selected access point.

13. The computer program product of claim 8, further comprising computer readable program code configured to prohibit the radio in the selected access point from transmitting signals in the frequency band.

14. The computer program product of claim 8, further comprising computer readable program code configured to dynamically transfer the radio to operate in one of a plurality of operation modes.

15. A method, comprising: for each of a plurality of access points, calculating a respective density value based on a number of respective neighboring access points that are in direct communication with the access point and based on a path loss between the access point and at least one of the respective neighboring access points; selecting an access point from the plurality of access points based on the respective densities values; calculating locations of the respective neighboring access points relative to the selected access point; determining that a radio in the selected access point is redundant based on the calculated locations; and managing the radio in the selected access point to mitigate co-channel interference in a frequency band after determining that the radio is redundant
wherein calculating locations of the respective neighboring access points comprises calculating the locations as a function of a path loss in a first and second frequency band of the at least one of the respective neighboring access points; and
wherein the first and secondary frequency bands are different.

16. The method of claim 15, wherein the radio in the selected access point comprises a XOR radio configured to dynamically switch between the frequency band and a different frequency band.

17. The method of claim 16, further comprising switching the radio in the selected access point to transmit signals in the different frequency band after determining that the radio is redundant.

18. The method of claim 16, wherein the frequency band comprises a 2.4 GHz Wi-Fi frequency band and the different frequency band comprises a 5 GHz Wi-Fi frequency band.

19. The method of claim 16, wherein determining that the radio in the selected access point is redundant based on the calculated locations comprises:
determining that coverage area of the radio in the frequency band is covered by at least one of the respective neighboring access points of the selected access point.

* * * * *

UNITED STATES PATENT AND TRADEMARK OFFICE
CERTIFICATE OF CORRECTION

| | | |
|---|---|---|
| PATENT NO. | : 10,433,189 B2 | Page 1 of 1 |
| APPLICATION NO. | : 15/382059 | |
| DATED | : October 1, 2019 | |
| INVENTOR(S) | : Vishal Satyendra Desai et al. | |

It is certified that error appears in the above-identified patent and that said Letters Patent is hereby corrected as shown below:

In the Drawings

On sheet 6 of 13, in Figure 6, reference numeral 601, Line 1, delete "DISTREBUTED" and insert -- DISTRIBUTED --, therefor.

In the Specification

In Column 4, Line 11, delete "AP 1 's" and insert -- AP1's --, therefor.

In Column 5, Line 41, delete "APB," and insert -- AP8, --, therefor.

In Column 6, Line 10, delete "form" and insert -- from --, therefor.

In the Claims

In Column 16, Line 66, in Claim 1, delete "comprising" and insert -- comprises --, therefor.

In Column 17, Line 55, in Claim 8, delete "second" and insert -- secondary --, therefor.

Signed and Sealed this
Seventh Day of January, 2020

Andrei Iancu
*Director of the United States Patent and Trademark Office*